United States Patent
Hinsperger

(10) Patent No.: US 7,207,136 B2
(45) Date of Patent: Apr. 24, 2007

(54) METHOD AND PROTECTIVE, E.G., FOR GRASS PROTECTION, RESTORATION, SEED GERMINATION

(76) Inventor: Peter Hinsperger, c/o 645 Needham Lane, Mississauga, Ontario (CA) L5A 1T9

( * ) Notice: Subject to any disclaimer, the term of this patent is extended or adjusted under 35 U.S.C. 154(b) by 0 days.

(21) Appl. No.: 10/969,944

(22) Filed: Oct. 22, 2004

(65) Prior Publication Data

US 2005/0050794 A1 Mar. 10, 2005

Related U.S. Application Data

(63) Continuation-in-part of application No. 10/444,948, filed on May 27, 2003, now abandoned.

(30) Foreign Application Priority Data

Dec. 23, 2002 (CA) .................................. 2415074

(51) Int. Cl.
*A01G 13/04* (2006.01)

(52) U.S. Cl. ........................................................ 47/31
(58) Field of Classification Search ................ 47/29.1, 47/31, 29.4, 31.1
See application file for complete search history.

(56) References Cited

U.S. PATENT DOCUMENTS

| | | | | | |
|---|---|---|---|---|---|
| 3,848,359 | A | * | 11/1974 | Seith et al. | 47/56 |
| 4,644,684 | A | * | 2/1987 | Verbeeck | 47/31 |
| 4,730,633 | A | * | 3/1988 | Greenbaum | 135/93 |
| 5,058,317 | A | * | 10/1991 | McMurtrey | 47/31.1 |
| 5,070,643 | A | | 12/1991 | Hinsperger | |
| 5,288,545 | A | * | 2/1994 | De Decker | 442/185 |
| 5,605,007 | A | * | 2/1997 | Hinsperger | 47/17 |

FOREIGN PATENT DOCUMENTS

| | | |
|---|---|---|
| CA | 1272027 | 5/1986 |
| CA | 2033708 | 1/1991 |
| CA | 2303639 | 3/2000 |
| JP | 55-99659 | 1/1953 |
| JP | 55-14403 | 7/1953 |
| JP | 62-4953 | 1/1987 |

* cited by examiner

*Primary Examiner*—Son T. Nguyen
(74) *Attorney, Agent, or Firm*—McFadden, Fincham

(57) ABSTRACT

A protective heat absorbing and heat reflective covering material comprising an open mesh weave of scrim material, the mesh having warp and weft strips forming a substantially thin layer having opposed major surfaces, where at least one of the warp or weft strip materials is a heat absorbing or heat reflecting material, and at least one of the major surfaces of the scrim material has a discontinuous coating having heat reflecting or heat absorbing properties opposite to that of the warp and or weft strip, the discontinuous coating thereon at least partially covering the surface.

11 Claims, 1 Drawing Sheet

METHOD AND PROTECTIVE, E.G., FOR GRASS PROTECTION, RESTORATION, SEED GERMINATION

This application is a Continuation In Part of U.S. Ser. No. 10/444,948, filed on May 27, 2003, which claims priority to Canadian Patent Application No. 2,415,074, filed on Dec. 23, 2002.

FIELD OF THE INVENTION

The present invention relates to a method to protect and to enhance the growth of outdoor grass areas, and in particular to a method and product for covering an area of grass or the like substrate with an improved insulating cover which allows for heat absorption and heat reflection properties to be directed to the substrate thereby optimizing temperature conditions for growing of e.g. plants, grass, etc.

BACKGROUND OF THE INVENTION

There are various methods and products well known in the art which attempt to protect exterior grass and turf from desiccation, winter kill and the like by covering an area to be protected. Specifically, Canadian Patent No. 1,272,027 describes a woven insulated cover which is particularly well suited for use in preserving and protecting grassed areas from winter kill. The present invention improves upon the features of the '027 patent in the manner described below.

Also, in the case of gardens such as vegetable gardens, there is a need to maintain higher earth temperatures particularly for over the winter crops, germination of seeds and the like. At present, while there are certain types of air and water permeable products on the market, none of those products are very effective to enhance earth temperatures and promote early development of e.g. seeds or over-winter crops.

In the prior art, Applicant's U.S. Pat. No. 5,605,007 issued Feb. 25, 1997 discloses a greenhouse of a stabilized plastic material. The material described for the greenhouse includes a central cover section of transparent or translucent flexible material at a peripheral or vent section of a open weave scrim material likewise of a transparent or translucent characteristic, which scrim material is provided with a lace coating. As disclosed in this reference, the scrim material can be made of various types of thermoplastic material with the strips or ribbons of the scrim being substantially transparent or translucent. It is a requirement as taught in this reference that the transparent or translucent characteristics are required for the greenhouse to function properly as a greenhouse since in the absence of the transparent or translucent characteristics, light would not pass through the scrim material to permit plants to grow. The characteristic of being translucent can be achieved by use of strips which are lightly coloured provided they do not become opaque, which again would render the material forming the green house inoperative due to the non-passage of light therethrough. Similarly, this reference teaches that the lace like reinforced material can have the same characteristics as the scrim material— such lace like material must therefore be non-opaque, as otherwise the lace like material would block the transmission of the light characteristics.

Japanese Patent 59-15923 discloses a sheet like material for farming usage which sheet is made up of several different sections of material having different characteristics (see FIG. 2). It appears that the sheet structure is formed of sections of warp and weft yarn with spaced apart rows of raised strips which do not have a warp/weft structure. This stated structure is disclosed to have characteristics of a light shading while providing air flow passage.

Neither of the above references disclose or relate to a structure which is capable of providing heat reflective properties on one surface of a sheet structure, while at the same time providing heat absorptive properties on an opposed surface where the structure is of a continuous nature. Such a feature would provide a highly advantageous sheet material which can be used for a ground cover suitable for growing vegetables or the like and one which would be simple to manufacture yet be capable of withstanding North American winters.

SUMMARY OF THE INVENTION

According to one aspect of the present invention there is provided an improved protective scrim material, suitable for use in the above described fields, having heat reflective properties and heat absorption properties in order to impart improved temperature conditions to the covered surfaces.

According to another aspect of the present invention there is provided a heat-reflective and heat-absorptive cover comprising a substantially continuous sheet formed of a layer of moisture permeable scrim material having opposed major faces, the scrim material comprising a mesh weave of intersecting warp and weft strips forming a substantially continuous covering defined by the mesh weave, one only of the major faces having a discontinuous lace coating thereon and in intimate contact therewith, covering between about 15% to about 65% of the major face having the coating, the coating having heat-reflective or heat-absorptive characteristics, the warp and weft strips having on the other of the major face, opposed to the face having the lace coating, heat-absorbing or heat-reflecting properties opposite to the heat-reflective or heat-absorptive properties of the lace coating, characterized by at least about 15% to about 65% of at least one of the warp and weft strips being provided with a material capable of rendering the at least one of the warp and weft strips heat-reflective or heat-absorptive.

According to yet another aspect of the present invention there is provided a cover, wherein the at least one of the warp and weft strips are provided with an opaque coating to render the warp or weft strips heat-reflective or heat-absorptive.

In a preferred embodiment of the present invention, the protective material is a continuous sheet of a one-piece "open" weave thermoplastic scrim material which may be provided with suitable stabilizing additives conventional in the industry as represented by ultraviolet stabilizers, extenders, anti-oxidants and the like.

Desirable properties exhibited by the products of the present invention are that the cover includes heat absorption and heat reflection properties to permit enhanced substrate conditions together with the fact that the product is moisture permeable when subjected to water pressure similar to that encountered during rainfall, or under conditions of watering an area (i.e. with a hose) while at the same time being able to retain moisture beneath the protective cover without permitting the same to substantially evaporate. In a like manner, the product of the present invention permits the passage of atmospheric air under normal atmospheric conditions so that the cover "breathes" but at the same time, prevents abnormal atmospheric conditions e.g. atmospheric wind from penetrating to any extent through the protective cover. This aspect of the present invention is particularly suitable in the application of the protective cover for use as a turf or field cover. In a preferred embodiment, the turf or grass protective cover includes either one of the warp or weft strips as a transparent to allow light to permeate through and assist in the growth of the grass of turf there-beneath.

When the protective cover is in use in either of the above described fields, desirably the scrim layer comprises an open-mesh weave of thermoplastic scrim material, the mesh comprising one or more substantially thin layers of intersecting strands of thermoplastic material forming a substantially closed formation when in a lay-flat condition having opposed major surfaces, the mesh having a plurality of slits formed by intersecting strands of the open-mesh weave thereby permitting the passage of moisture therethrough upon moisture pressure against the material. The plastic material forming the strips of said composite can be made of any suitable material such as a polyolefin, the preferred polyolefin being a polyethylene or polypropylene (or a copolymer). The lace coating and the warp and weft strips can be each made of the same or a different polyolefin compatible with the polymer of the other components.

With respect to the above described fields, the protective covering material includes one of the warp or weft strips having heat absorptive or heat reflective properties. Also, in some cases, it may be desirable to have both of the warp and weft strips with the heat absorptive or heat reflective properties in order to increase the amount of heat absorption or heat reflection of the product. Most preferably, the warp and weft strips form a substantially thin layer with opposed major surfaces. The amount of heat absorption or heat reflection (when only one of the warp or weft strips function to provide the heat absorption or heat reflection characteristics) can also be varied depending on the width of the individual warp and weft strips. For example, if the warp strips have a width twice that of the weft strips, and if only the warp strips are provided with the heat reflective or heat absorptive properties, then the amount of heat absorption or heat reflection will be significantly increased compared to a similar product where the warp and weft strips have a similar width.

Most preferably, other than the 15 to 65% of either the warp and/or weft strips which have the heat reflective or heat absorptive property, the balance of the strips (i.e. the 85% to 35% of such strips) permit the passage of light so that they are translucent, semi-transparent or clear. This translucent property allows for light to reach the turf beneath the protective cover so as to promote growth thereof.

One of the major surfaces of the scrim has a discontinuous coating thereon, e.g. a lace coating which at least partially covers the surface, where the coating has heat reflecting properties or heat absorbing properties opposite to that of the warp and weft strips. The lace coating is thus either heat absorptive or heat reflective depending on the nature of heat absorption and or heat reflective properties of the warp and weft strips.

The thickness of the scrim material used in the method of the present invention for either of the above fields is not critical per se, as long as the product remains flexible and to the extent that water is generally able to permeate the surface; the thickness can be e.g. from 1 mil to e.g. 30 mils. or more if desired. The lace coating may likewise be relatively thin so that an overall lightweight covering can be obtained. For various types of applications, it may be desirable to provide a border surrounding the sheet material to provide an integral product. Typically, preferred materials for the scrim layer and lace coating are thermoplastic in nature and by way of example such materials may be formed from a polyolefin such as polyethylene, polypropylene, copolymers, etc.

The coating component of the covering material of the present invention is of a discontinuous or intermittent nature, desirably in the form of a lace coating, and which forms an irregular pattern on one surface of the scrim layer. As will be described hereinafter, the lace coating can be in the form of irregular islands of coating with the islands being connected by strands or narrow strips of coating material. This coating tends to stabilize the warp and weft strips of the scrim layer and thus forms an integral product, particularly when the warp and weft strips of the scrim layer are not otherwise adhesively associated with one another. The lace coating may be formed from a heat absorbing material or a material having a heat absorbing component such as coloured material. Desirably, the coating will cover between 5% to 80% of the scrim layer on one face thereof, most desirably 10% to 65% and preferably 15% to 50% of that surface. The coating may be applied to the scrim layer by suitable conventional techniques such as calendering, spraying, co-extrusion, or even adhesively bonded.

With respect to the heat absorbing function of either the lace coating or at least one of the warp or weft strips, such characteristics can be achieved by either selecting a thermoplastic material which has the capability of absorbing heat from the atmosphere (using selected additives in the material) or alternatively, by utilizing a colouring agent of a suitable characteristic which absorbs the energy emitted via the normal spectrum of light waves. Likewise, the other of the lace coating or of the warp/weft strips which is provided with reflective characteristics is produced, for example, by applying a colouring agent to the surface area from the normal light spectrum having heat specular properties such as white, silver, gold, bronze, etc.

If desired, one or more reinforcing layers or threads may be included in the product structure where very thin covering products are used. Such a reinforcing layer or threads can strengthen the product as desired, particularly for large products covering large surfaces. For example, depending upon the desired use of the protective cover in either of the above noted fields, such reinforcing layers can be in the form of additional reinforcing scrims incorporated into the material on one or both sides, desirably below the lace coating. Reinforcing techniques are known in various arts; they may be incorporated into the product on an in-line basis when the product is manufactured, or by extrusion, coating or like techniques. Any added reinforcing layer should not reduce the total slit availability of the material in such a manner as to close off substantially all of the slit apertures between adjacent strands; it may contribute to a reduced slit availability when this is desired to thereby provide different water permeability characteristics for different areas of the woven material.

As otherwise outlined herein, heat retention or heat absorption properties for the covering materials of the present invention, can also be varied by different means such as using concentrated or strong colours, or by including heat absorption additives in the warp/weft strips or lace coating. Thus, by way of example, reflective or absorptive particles could be included in the lace coating and/or the warp/weft strips to increase the properties desired. In addition, in the case of extruded polymeric materials for use in the lace coating, or the warp/weft strips, a co-extruded product could be employed to vary the amount of heat absorption/heat reflection characteristics of the product. Thus, even transparent, semi-transparent, or translucent strips or lace coating can be employed in which the strips or coating are of a co-extruded nature and in which a second component of the product provides the desired properties.

As otherwise outlined herein, heat retention or heat absorption properties for the covering materials of the present invention, can also be used in various climates and under varying conditions. Thus, depending on its intended application in either of the above described fields, the protective cover and its make-up may vary considerably. For example, a product of the present invention can find use in colder climates by having one component (e.g. the warp/weft strips) with strong heat absorption properties together with the other component (e.g. the lace coating) with strong heat reflection properties whereby maximum amounts of heat can be retained in the substrate as well as be absorbed from the light. When strong heat reflection or heat absorption are desired, both the warp and weft strips can be provided with the desired property; in addition, by varying the amount of coverage formed by the lace coating on one surface of the product, increases or decreases in the light absorption or light reflection can be obtained.

In warmer climates where heat absorption is not of a primary concern, but heat retention is desired (such as due to cooler nights) again the product structure may vary by having, for example, both warp and weft strips functioning as a heat retention layer and by modifying the lace coating to include either lower heat absorption properties (e.g. by reducing the colour intensity) and/or by decreasing the amount of the lace coating. Such a use contemplated by the present example finds particular use as a protective cover for grass or turf areas.

The products of the present invention are particularly suitable for use on lawns, golf greens, or other turf applications where it is desired to control and enhance the ambient temperature of the turf or like surface. By way of example, golf greens frequently employ protective covering layers for wintering purposes; by utilizing the cover of the present invention, not only is moisture permitted to reach the substrate, and be ventilated, but due to the heat reflective layer, heat can be transferred to the substrate particularly for Spring-time use. Likewise the heat temperature of the substrate can be enhanced due to the heat reflective layer of the product and its function of reflecting radiated heat from the substrate back into it. It will be obvious to those skilled in the relevant art that different degrees of heat absorption and heat radiation can be achieved for different purposes in the products of the present invention to permit products to be tailored for different applications and locations. One particular advantage of the present invention is that since only one lace coating is required, there is a savings in material, savings in the time required for producing the product, and costs are reduced.

BRIEF DESCRIPTION OF THE DRAWINGS

Having thus generally described the present invention, reference will now be made to the accompanying drawings as follows.

DETAILED DESCRIPTION OF THE PREFERRED EMBODIMENTS

The products of the invention are particularly suitable for protecting environmentally sensitive areas, such as turf or grass areas where, for example, selected portions of such turf or grass must be protected. Such areas may include, but are not limited to, athletic fields (such as natural grass baseball or soccer stadiums where the infield is a specially groomed surface), golf courses (where golf greens are maintained to higher standards compared to the balance of the playing area), or agricultural (e.g. garden) applications. In such areas, diverse types of grass or vegetation may be used compared to adjacent areas, and various types of chemical treatments from fertilizers to herbicides may be used in order to maintain such areas at certain standards.

Figure 1:
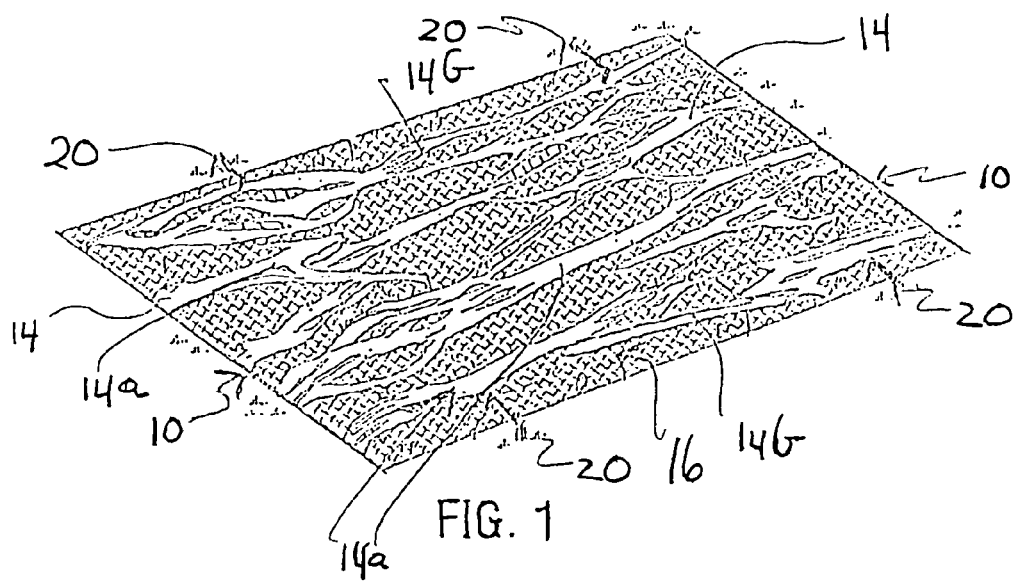
FIG. 1 is an elevated perspective view of a product of the present invention, which illustrates one face of the product provided with a lace type coating over the scrim structure.

FIG. 1 illustrates a cover (10) according to a preferred embodiment of the present invention in use over an area to be protected, in this case a golf green. As illustrated cover (10) consists structurally of a scrim layer indicated generally by reference numeral (16) with opposed major surfaces (22) and (26), and a discontinuous plastic polymer lace coating (14). Lace coating (14) is located only on one surface (22) and comprises a calendared polymeric material in the form of connected elongated "islands" (14a) of coating material as seen in FIG. 1. Adjacent islands (14a) are interconnected by strands or small lengths of coating material (14b), in a random fashion. These islands (14a) will have varying widths and lengths but in general, the total surface area coverage of the lace coating in the embodiment illustrated is in the range of 15 to 20% of the surface on which it is located. Desirably, the overall cover is lightweight and flexible to allow for easy manipulation of the protective cover (10) over a substrate.

In the present embodiment, the discontinuous coating layer (14), provides a heat absorbing layer for the product. In this case, given the amount of heat absorption generally required for this particular application and given the climate in which the application is located in (with relatively cool evening temperature conditions and warmer daylight temperatures), the amount of heat absorption required is relatively low, but conversely, the amount of heat retention required is significant.

In a preferred embodiment, the heat absorbing material (the lace coating layer (14)) is a polyolefin polymer, provided with a suitable colouring agent for absorption of heat. For example, opaque, solid or non-translucent colours such as green, blue, black, and the like, provide suitable heat absorption properties for the layer (14) absorbing ultraviolet rays from the sun and can be used in the lace coating material. By using such solid colours or other additives or materials, as opposed to translucent or semi-translucent colours or materials, the present invention allows for the warp and/or weft strips to be heat reflective or heat absorptive.

As illustrated in FIG. 1, cover (10) is maintained or secured in place through suitable securing means, for example a plurality of elongated clips or pins (20). Pins (20) are spaced apart peripherally about the cover (10) and are adapted to releasably secure the cover to the surface of the green. Pins (20) would include a suitable catch, for example, a hook which could be driven into the substrate. The other end of the pin (20) may also be provided with a hook to penetrate the cover (10) and likewise be inserted into the substrate. Other securing means such as hooks, wire stakes, etc. may alternatively be used to releasably secure the cover (10). Alternatively, cover (10) may include other means (not shown) such as reinforced apertures (eyelets) which may also be used in combination with a pin (20).

Figure 2:
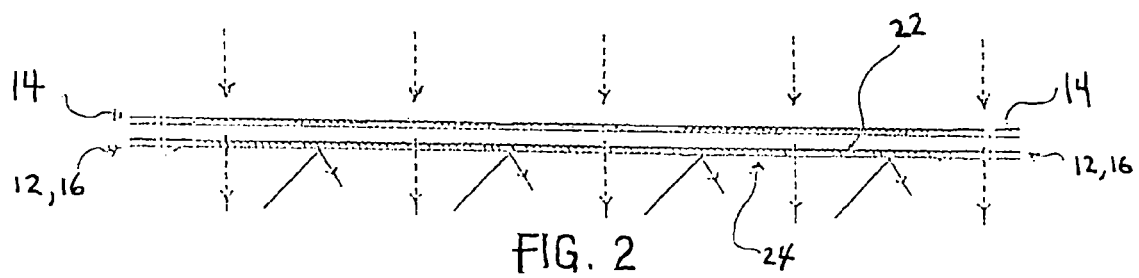
FIG. 2 is a diagrammatic cross-sectional view of the present invention.

FIG. 2 is a schematic representation of a cross-sectional view of the protective cover (10) when in use over a golf green. As will be seen, the heat reflection surface constituted by the warp and/or weft strips (22) and (24), as described above with respect to FIG. 3, and which are provided with heat reflecting properties, face the substrate. Due to the relatively tight knit weave of the warp and weft strips forming the scrim material, even with slits (26), much of the heat normally removed during the evening will be retained in the substrate.

Figure 3:
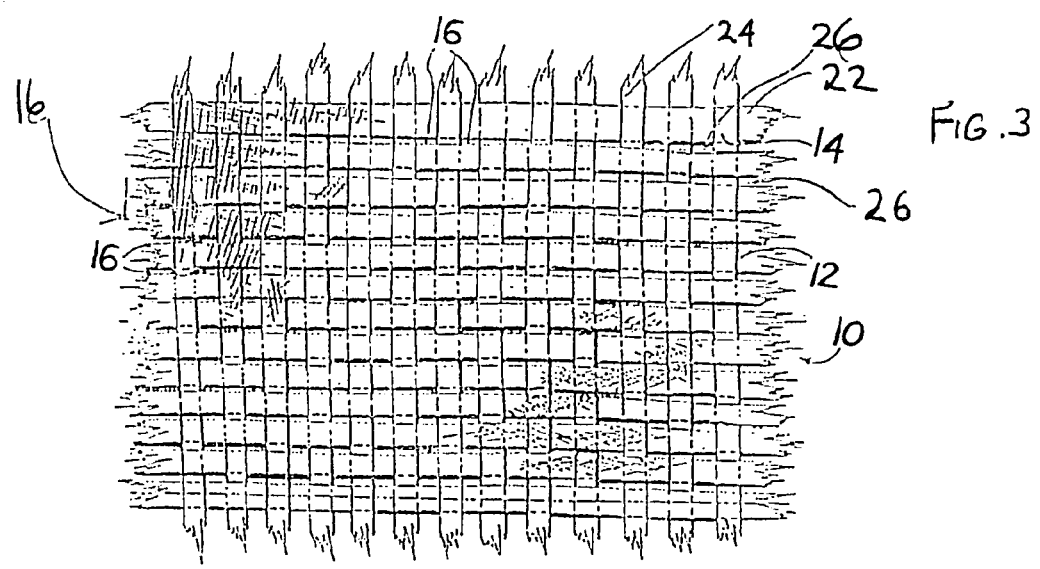
FIG. 3 is an enlarged bottom view showing the reverse side of the product of FIG. 1, which shows the scrim structure of warp and weft strips.

FIG. 3 shows schematically the reverse face of the product of FIG. 1 and illustrates the structure of the warp and weft strips forming the scrim layer. For ease of reference and clarity, the lace coating on the other surface of the product is not shown (the lace coating, of course, would otherwise cover some of the slits between the warp and weft strips described hereinafter). In greater detail, as illustrated in this enlarged figure, there are provided a plurality of spaced apart weft strips (22) and warp strips (24) which are interwoven to form the scrim layer (16). The intersecting warp and weft strips can be slightly spaced apart, if desired, to provide slits 26 in the scrim layer, which slits (26) can be varied as to the degree of openness by controlling the tightness of the "weave" of the scrim layer. In the particular version shown, the slits may constitute anywhere from 1% to 15% or so of the total surface area of that face of the scrim layer, so to permit water to penetrate the product and provide moisture to the substrate layer. It will be appreciated that weft and warp strips (22) and (24) need not be spaced apart per se in order to permit water penetration. This is due to the fact that such warp and weft strips, even though generally retained in place by the lace coating, are not otherwise secured to each other and thus even slight moisture pressure can penetrate between intersecting warp and weft strips.

The individual weft and warp strips (22) and (24) can vary in width considerably, as noted previously. In the arrangement illustrated in FIG. 3, the warp and weft strips are generally of the same dimension(s) width wise, but as noted previously this can be varied so that one has a larger width than the other, depending on the ultimate heat reflective or heat absorptive properties desired in a product for any given application. Typically, the width of the warp and weft strips can range from about ⅛th of an inch to 1 inch or more. For most general applications, these strips will have a width in the range from ¼ inch to 2 inch.

In the embodiment shown in FIG. 3, one of the warp and weft strips or both are provided with heat reflective components (such as a colouring agent being included in the warp/weft strips). In this manner, the product as shown in FIG. 1 will include a heat reflective layer in contact with the substrate surface and will reflect radiated heat from the substrate surface back into the substrate.

In a preferred embodiment, as illustrated in FIGS. 1, 2 or 3, the protective cover (10) includes a discontinuous lace coating (14), having warp and weft strips (22,24) interwoven to form a scrim layer generally indicated by reference numeral (16). In such a preferred embodiment, the cover (10) includes heat absorptive properties in only one of the warp or weft strips (22,24). The other of the warp or weft strips having neither heat reflective or heat absorptive properties is clear, in other words the strip material may be translucent or transparent. Such transparent properties thereof are adapted to allow light to pass through the transparent strip(s) to enable the turf or grass area there beneath to grow or otherwise propagate. With respect to the aforementioned ranges, the use of such ranges, as they apply to the warp or weft strips, and as it applies to the lace coating, is sufficient to generate heat or reflect heat.

If desired, heat reflective material may be included in the discontinuous lace coating (14) to reflect absorbed heat, from the appropriate warp or weft strip, to be re-directed into or away from the protected turf (dependent upon the desired use of the protective cover (10)).

The lower layer formed by warp and weft strips may be a similar polyolefin polymer, for example, polyethylene, is provided with a colouring agent having heat reflection properties. Thus, colours from the spectrum such as white, silver, gold, bronze, etc. would be used for the material on the bottom layer to provide sufficient reflection characteristics for the retention of heat and moisture.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A heat-reflective and heat-absorptive ground temperature controlling ground cover for placement on a substrate, said ground cover comprising: a substantially continuous sheet formed of a layer of water permeable scrim material having opposed major faces, said scrim material comprising an open, spaced apart mesh weave of intersecting warp and weft strips forming a substantially continuous covering defined by said mesh weave, one only of said major faces having a discontinuous lace coating thereon and in intimate contact therewith, covering between about 15% to about 65% of said major face having said coating, said coating having either a heat-reflective or heat-absorptive characteristics, said warp and weft strips having on the other of said major face, opposed to the face having said lace coating, either heat-absorbing or heat-reflecting properties opposite to the heat-reflective or heat-absorptive properties of said lace coating, characterized by at least about 15% to about 65% of at least one of the warp and weft strips being provided with a material capable of rendering said at least one of the warp and weft strips heat-reflective or heat-absorptive.

2. The cover of claim 1, wherein said at least one of the warp and weft strips are provided with an opaque coating to render said warp or weft strips heat-reflective or heat-absorptive.

3. The cover of claim 1, wherein said lace coating is provided with an opaque coating to render said lace coating heat-reflective or heat-absorptive.

4. The cover of claim 1, wherein said warp or weft strips are provided with a colouring additive to render said warp or weft strips heat-reflective or heat-absorptive.

5. The cover of claim 4, wherein said additive is a colouring agent chosen from green, blue, brown or black and is present in an amount to render said wrap or weft strips substantially opaque to thereby become heat-absorptive.

6. The cover of claim 4, wherein said additive is a colouring agent chosen from silver, gold or bronze and is present in an amount to render said warp or weft strips substantially opaque to thereby become heat-reflective.

7. The cover of claim 1, wherein said lace coating is provided with a colouring additive to render said lace coating heat-reflective or heat-absorptive.

8. The cover of claim 7, wherein said additive is a colouring agent chosen from green, blue, brown or black and is present in an amount to render said lace coating substantially opaque to thereby become heat-reflective.

9. The cover of claim 7, wherein said additive is a colouring agent chosen from silver, gold or bronze and is present in an amount to render said lace coating substantially opaque to thereby become heat-reflective.

10. The cover of claim 1, wherein between about 15% to about 50% of the warp or weft strips are provided with said material to render said warp or weft strips heat-reflective or heat-absorptive.

11. The cover of claim 1, wherein between about 15% to about 50% of the lace coating is provided with said material to render said lace coating heat-reflective or heat-absorptive.

* * * * *